United States Patent
Reaves et al.

[11] 3,765,743
[45] Oct. 16, 1973

[54] OPTICAL ENERGY DETECTION SYSTEM INCLUDING IMAGE PLANE SCANNING SYSTEM

[75] Inventors: David Herbert Reaves, Whitesboro; John Pearson Walker, Jr., New Hartford, both of N.Y.

[73] Assignee: General Electric Company, Utica, N.Y.

[22] Filed: June 16, 1971

[21] Appl. No.: 153,660

[52] U.S. Cl. .................................. 350/7, 178/7.6
[51] Int. Cl. ........................................ G02b 17/00
[58] Field of Search ................ 350/67, 286, 285, 350/1; 250/235, 236; 178/7.6

[56] References Cited
UNITED STATES PATENTS

| | | | |
|---|---|---|---|
| 3,350,156 | 10/1967 | Adams | 350/285 |
| 3,591,249 | 7/1971 | Wildhaber | 350/6 |
| 2,401,690 | 6/1946 | Luboshez | 356/16 |
| 1,821,349 | 9/1931 | Leventhal | 350/6 |
| 3,441,334 | 4/1969 | Marks et al. | 178/7.6 X |
| 3,360,659 | 12/1967 | Young | 250/236 |
| 2,972,280 | 2/1961 | Kudar | 178/7.6 X |
| 3,468,594 | 9/1969 | Vogl et al. | 350/1 |
| 3,614,194 | 10/1971 | Harris | 350/7 |

*Primary Examiner*—David Schonberg
*Assistant Examiner*—Michael J. Tokar
*Attorney*—Robert P. Cogan et al.

[57] ABSTRACT

In an optical energy detection system, objective optics provide optical energy to a scanning wheel carrying a plurality of prisms. Each prism is a rhomboid. A first reflecting surface of the prism, preferably normal to the diameter of the wheel, reflects optical energy to a second surface radially inwardly of the first surface, and the second surface reflects optical energy which is focused on a detector. As the scanning wheel turns, successive prisms provide an optical path between the objective optics and the detector. In the preferred embodiment, each prism has a high index of refraction for increasing the mechanical back focal length of the objective optics.

16 Claims, 5 Drawing Figures

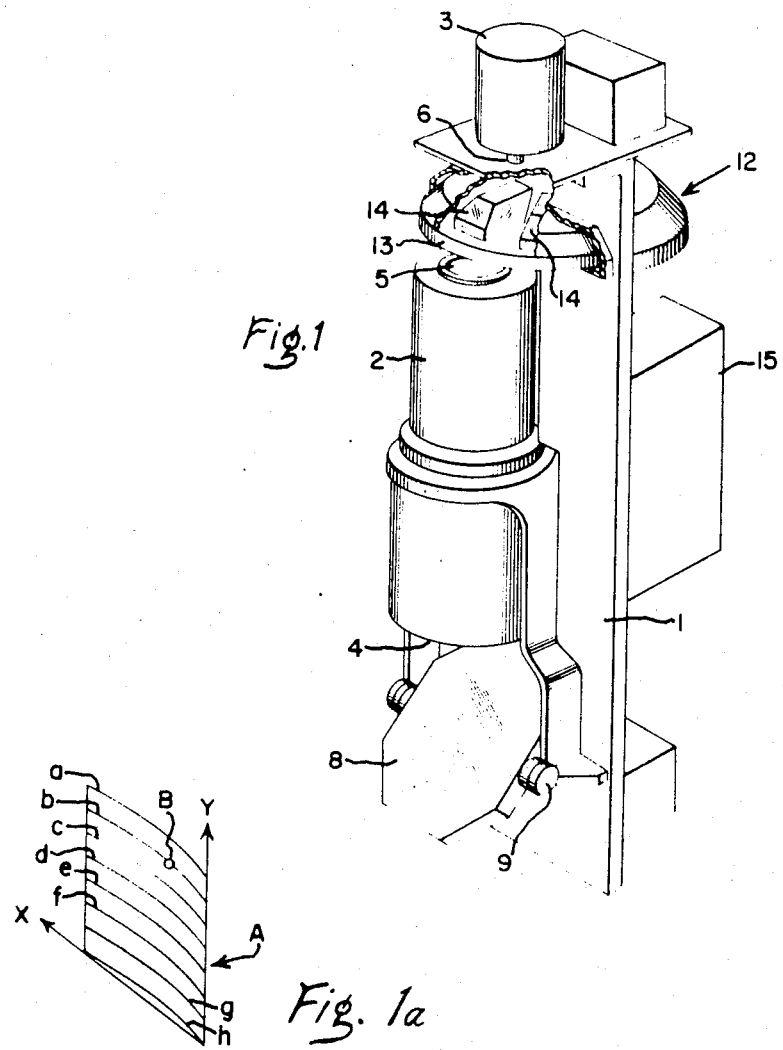

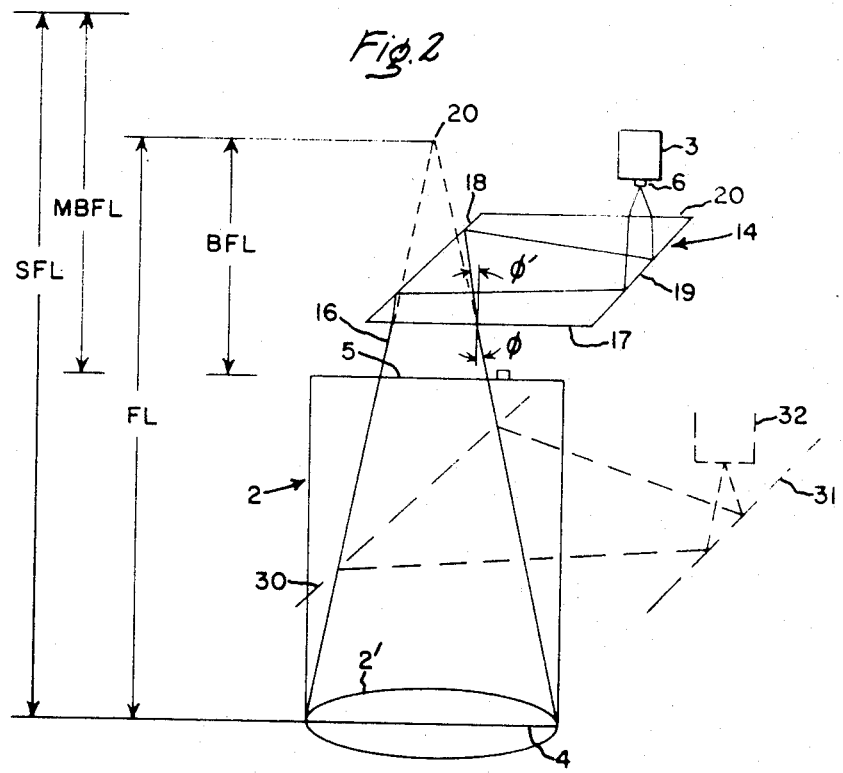
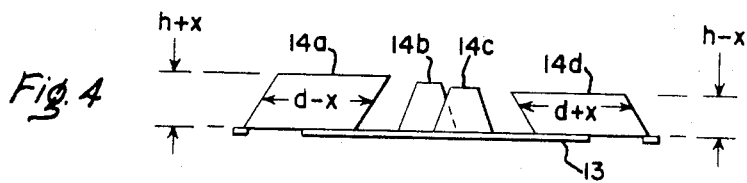
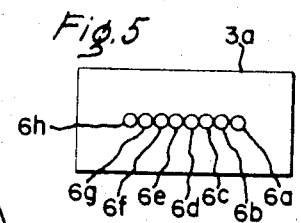
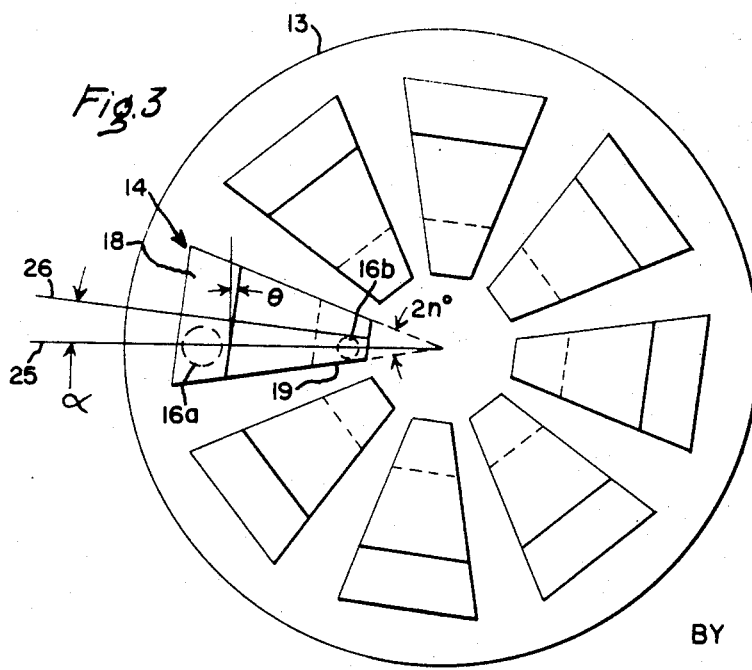

OPTICAL ENERGY DETECTION SYSTEM INCLUDING IMAGE PLANE SCANNING SYSTEM

BACKGROUND OF THE INVENTION

This invention relates to optical energy detection systems, and more particularly to scanning aparatus within such systems.

The purpose of a scanning system is to enable a detector to respond to an image which is larger than the detector. Objective optics receive optical energy within a field of view and focus an image of the scene within the field of view on an image plane. Scanning means within the scanning system are positioned between the objective optics and the detector and move to sequentially focus successive portions of the image on the detector. In this manner, the image is scanned, and the detector produces a series of electrical impulses which may be provided to a display such as a television system. The scanning action integrated over a period of time thus increased the field of view of the detector. It is noted that image scanning means which provide scan in a first dimension are often used in conjunction with object scanning means which scan a field of view in a second direction. The term object scanning aparatus denotes scanning means which are not included in the optical path from the objective optics to the detector.

One common form of image plane scanning means comprises a rotating prism, for example octaganal or hectagonal, interposed between objective optics and a detector. As the prism rotates, it refracts optical energy from the objective optics and directs successive portions of the image at the detector. In such a system, as the angle of the refractive surface increases with respect to the axis of the objective optics, image quality deteriorates due to distortion. Further, the rotating prism is effective to transmit optical energy from the objective optics to the detector only during portions of its rotation due to its geometry. Consequently, optical efficiency is decreased. Optical efficiency may be defined as the fraction of a scanning means rotation during which it provides useful optical energy to a detector. Another well-known system is the "periscope" scanner in which pairs of mirrors, each pair comprising a periscope arrangement, are mounted for rotation about an axis. Each pair is successively moved over the objective optics to reflect optical energy to the detector. Due to the optical parameters involved in such a system, scanning efficiency is limited due to the size and shape of the mirrors; a large fraction of the circle which their paths describe cannot be covered by mirrors or they would mechanically interfere with each other. Further, relative alignment of the mirrors within each pair is critical to proper operation but is most difficult to maintain. In addition, due to the size of the mirrors, if used in conjunction with objective optics having a relatively short back focal length, the mirrors may be incapable of focusing an image on a detector.

SUMMARY OF THE INVENTION

It is, ttherefore, an object of the present invention to provide an optical energy detection system including a high efficiency image plane scanning system utilizing prisms mounted on a scanning wheel for coupling optical energy from a lens to a detector.

It is also an object of the present invention to provide an optical energy detection system utilizing an image plane scanning system which inherently increases the focal length of the objective optics.

It is another object of the present invention to provide a scanning wheel in which first and second reflective surfaces reflect light from objective objects to a detector and in which distortion due to misalignment of reflective surfaces is eliminated.

It is a further object of the present invention to provide a scanning system which is mechanically compatible with varying types of objective optics in an optical energy detection system.

It is yet another object of the present invention to provide a scanning system which may be constructed to scan an image in an interlaced rather than sequential manner.

It is still another object of the present invention to provide an image plane scanning system in which optical distortion may be minimized.

It is a further object of the present invention to provide an image plane scanning system in which optical efficiency may be maximized.

Briefly stated, in accordance with the present invention there is provided an optical energy detection system including, a high efficiency image plane scanning system in which objective optics are provided for focusing an image on a detector. A scanning wheel is provided on which at least one rhomboid prism rotates. A first surface reflects a converging cone of rays to a second surface of the rhomboid and focuses a portion of the image on the detector. In the preferred embodiment each prism has a high index of refraction for increasing the focal length of the objective optics.

BRIEF DESCRIPTION OF THE DRAWINGS

The foregoing objects and features of novelty are embodied in the apparatus particularly pointed out in the claims forming the concluding portion of the specification. The invention, both as to its organization and manner of operation, may be further understood by reference to the following description taken into connection with the following drawings.

Of the drawings:

FIG. 1 is an illustration of an optical energy detection system incorporating an image plane scanning system in accordance with the present invention;

FIG. 1a is a diagram of the scanning function performed by the system of FIG. 1;

FIG. 2 is an optical ray diagram illustrating the manner in which a first embodiment of the present invention focuses optical energy from the detector;

FIG. 3 is a plan view of a scanning wheel constructed in accordance with the present invention illustrating the manner in which a line of the image is scanned;

FIG. 4 is a cross section of a scanning wheel included in a further embodiment of the present invention; and FIG. 5 is an illustration, a detector used in conjunction with the embodiment of FIG. 4.

DESCRIPTION OF THE PREFERRED EMBODIMENTS

Referring now to FIG. 1, there is illustrated an optical radiant energy detection system constructed in accordance with the present invention incorporating an image plane scanning system of the present invention. The radiant energy detection system used for purposes of illustration is an infrared detection system where the invention is particularly suited for use. However, it is equally applicable to other forms of radiant energy detection systems. A panel 1 supports objective optics 2 for focusing optical energy on a detector 3 including a sensitive element 6. The detector 3 is displaced from the axis of the objective optics 2. In the present embodiment the objective optics 2 comprises a long focal length lens having multiple elements. The objective optics 2 could also comprise a single element thin lens 2' FIG. 2. The lens 2 has an entrance aperture 4 and an exit aperture 5. Object scanning is performed in a well-known manner by object scanning means comprising a tiltable mirror 8 mounted on a pivot number 9 included on the panel 1 adjacent to the entrance aperture 4. Image plane scanning is accomplished in accordance with the present invention by a scanning wheel assembly 12, including a scanning wheel 13 and a plurality of prisms 14. The scanning wheel 12 is mounted adjacent to exit aperture 5 and rotates in a plane preferably normal to the axis of the lines 2. The scanning wheel 13 has an aperture (not shown for simplicity of the drawing) in registration with each prism 14 for providing an optical path through the scanning wheel 13. As each of the prisms 14 sequentially passes over the lens 2, it intercepts a converging cone of rays 16 and reflects it to the detector 3. The detector 3 converts optical energy into electrical impulses for utilization by an electronics unit 15 for provision to the utilization means such as a display (not shown) which may comprise a television system. The scanning wheel asembly 12 is rotated by any convenient means, for example, a motor (not shown) rotating at a speed to produce a scan rate compatible with the electronics utilized and it may further include a counter-rotating mass (not shown) to counteract gyroscopic effects of the spinning of the scanning wheel 13.

The electronics unit 15 provides a series of electrical impulses wyich over a period of time are indicative of the image of an object. This is illustrated in FIG. 1a by reference to an object A in the field of view of the lens 2. The object A may be visualized as having vertical or y coordinates and horizontal x coordinates. The angular position of the object scanning means 8 determines which y coordinate will be focused on the detector 3 while the angular position of the image scanning means, the prism 14, determines which x coordinate will be focused on the sensitive element 6 of the detector 3. The relative angular speeds of the image and object scanning means may be said to provide a scan that may be visualized as a spot B moving across a plurality of curved lines $a, b \ldots, h$ in sequence. The point b is equal to the field of view of the detector 3 (not to be confused with the field of view of the lens 2). A dot does not move sequentially across the lines $a$-$h$, but this conceptualization is used to indicate that optical energy from sequential portions of the object A is focused on the sensitive element 6 of the detector 3. In actuality, the image formed by the lens 2 is translated along an arc of a circle by each prism 14 as it passes over the lens 2. The radius of the circle is equal to the lateral separation of the reflective surfaces of the prism 14, and the center of the circle is the optical axis of the lens 2.

THEORY AND OPERATION

The image plane scanning system of the present invention performs its function by focusing an image on the detector 3 and by scanning along one axis, in the present embodiment the x axis. While these functions are performed simultaneously, they are analyzed separately here for purposes of a tutorial description. The focusing function is described with respect to FIG. 2, and the scanning function is described with respect to FIG. 3. In FIGS. 2 and 3, the same reference numerals are used to denote the same elements corresponding to these of FIG. 1.

Referring now to FIG. 2, the lens 2 has a focal length FL. A cone of rays 16 emanating from a point B will converge when transmitted in air at a point 20, a distance FL from the entrance aperture 4 of the lens 2. An image transmitted in air will appear only at an optical path length equal to FL from the entrance aperture 4. Similarly, the lens 2 of the present example has a back focal length BFL from its back (the side facing the image plane) to the point 20. To form the image, the entire cone of rays 16 must be intercepted by image scanning means. For example, if it were desired to intercept the cone from rays 16 with a first mirror 30 and reflected the optical energy therefrom with a second of mirror 31 to a detector 32 (all shown in dotted lines) the total optical path length from the entrance aperture 4 to the detector 32 would have to be equal to FL. Such an arrangement in the present situation is impossible because to obtain the optical path length FL from the detector 32 to the entrance aperture 4, the mirror 30 would mechanically interfere with the lens 2.

Therefore, in accordance with the preferred embodiment of the invention, the prism 14 is provided consisting of a material having a high index of refraction. The prism 14 may, for example, consist of germanium having an index of refraction N' of 4. Use of a prism 14 consisting of a material having a high index of refraction refracts the optical energy in the cone of rays 16 such that the lens 2 and prism 14 provide a system focal length SFL which is longer than FL. Similarly, utilizing the nomenclature of a long focal length lens. The lens 2 and prism 14 provide a mechanical back focal length MBFL which is longer than BFL.

Assume the cone of rays 16 upon leaving the lens 2 travels through a medium of air having an index of refraction N of 1. A ray in the cone 16 forms an angle $\phi$ with a line parallel with the axis of the lens 2, that is refracted after entering the prism 14. The angle formed by the ray in the prism 14 with the line parallel to the axis of the lens 2 is $\phi$. By standard optical theory N' sin $\phi'$ = N' sin $\phi$. Consequently, the distance from the back of the lens 2 to the point 20 at which rays in the cone of optical energy 16 converge is increased from BFL to MBFL. Consequently, the detector 4 and prism 14 may be positioned such that the prism 14 intercepts the cone of rays 16 at a farther distance of the entrance aperture 4 than a mirror reflecting optical energy in air would be. Hence, in the present embodiment, the prism 14 is free of mechanical interference with the lens 2. Referring now in greater detail to the prism 14, in the preferred embodiment it is a rhomboid. In other words, its cross section in the radial direction with respect to the scanning wheel 13 is a parallelogram. Optical energy enters a surface 17 of the prism 14, and is reflected by a surface 18 to a surface 19 parallel to the surface 18. The surface 19 reflects optical energy to the detector 4 to a surface 20 parallel to the surface 17. Since the reflecting surfaces 18 and 19 are formed in the prism 14, no relative misalignment between the surfaces 18 and 19 can occur. Thus the rotating prism arrangement is useful even where the additional advantage of a prism consisting of a material having a high index of refraction to increase the focal length from the entrance aperture 4 to the detector 3 to SFL. It should be noted that the prism 14 need not be a rhomboid. Well-known optical theory may be used to obtain a different shape capable of focusing optical energy on the detector 3. Each prism 14 of the present embodiment is a constant deviation prism in that it does not rotate an image while displacing the image from the axis of the lens 2. In the embodiment of FIG. 2, the prims 14 need not be constant deviation prisms.

In other words, where a thin lens 2' (shown superimposed on the lens 2) is utilized, the mechanical interference problem discussed above does not arise. It is still preferable to use a prism having a low index of refraction over a mirror arrangement since the constant adjustment to maintain parallel reflecting surfaces between the thin lens 2' and detector 3 is not necessary. Each of the prisms 14 on the scanning wheel 13 are of physical dimensions such that they provide the same optical path length within the prism 14. Consequently, each of the prisms 14 focuses optical energy on the sensitive element 6 of the detector 6.

Referring now to FIG. 3, the manner in which an image, for example, the image of the line of a FIG. 1, is scanned is analyzed. In FIG. 3, 25 is a plane intersecting the center of the cone of rays 16 and including the point at which the rays are focused on the detector 3. Numeral 26 is the radial center line of the prism 14; $\alpha$ is the angle between the lines 25 and 26; $\theta$ is the angle between the surface 18 and a plane normal to the plane 25, 16a is the intersection of the cone 16 with the surface 18, and 16b is the intersection of the cone rays 16 with the surface 14. The detector 3 (FIG. 2) is positioned over the spot 16b. As the scanning wheel 13 rotates and a prism 14 intercepts the cone of rays 16, and $\alpha$ changes from minus $n°$ to plus $n°$, where $2n°$ is the angular width of the prism 14, the point B (FIG. 1) focused on the detector 3 moves along the line $a$. Distortion of the image of the point focused on the detector 3 is a fuction of $1-\cos\theta$. Since the prism 14 is constucted such that it is positioned to intercept the cone of rays 16 where the size of the cone of rays 16 is minimized, the angular width of the prism 14 is minimized. Consequently, distortion in scanning the image is minimized. In construction of the scanning wheel assembly 12, the prime parameters considered are distortion and optical efficiency. Scanning efficiency is the proportion of the rotation of the scanning wheel 13 during which optical energy is provided to detector 3. In other words, in the present embodiment where a prism 30° wide is placed in each 45° sector, the optical efficiency may be expressed as 30/45, or 240/360, or 0.667.

The angular width of each prism 14 may be chosen to provide distortion below substantially any desired level, and the angular spacing between prisms 14 may be chosen to correspond to the retrace of the electronics unit 15 (FIG. 1).

Referring now to FIG. 4, a scanning wheel assembly 12a consisting of a scanning wheel 13a and a plurality of prisms 14a, 14b, 14c and 14d is illustrated for use in conjunction with a detector 3a illustrated in FIG. 5. These elements would replace the scanning wheel assembly 12 and the detector 3 of the embodiment of FIGS. 2 and 3 respectively. Once again, as in the embodiment discussed in FIGS. 1-3, any number of prisms 14a, etc. may be included. The prisms 14a, etc. comprise constant deviation prisms of different dimensions. Constant deviation prisms 14 are preferred here to avoid complication of scanning since a plurality of sensitive elements 6 (discussed below) are utilized. For example, a first prism 14a is provided having a length $d-x$ and a height $h+x$. A second prism 14b is provided having a length $d$ and a height $h$. A third prism 14c has a length $d+x$ and a height $h-x$; another prism 14d has a length $d+2x$ and a height $h-2x$, where $x$ is an incremental distnce equal to the distance of between the centers of sensitive elements 6a, 6b, ... 6h in the detector 3a of FIG. 5. The scanning wheel assembly 12a of this embodiment includes four prisms 14a-14d. In other words, the prisms 14 are dimensioned to provide the same optical path length from the lens 2 to each sensor. Noting that a path $N'$ units long in a prism is equivalent to a path $N$ units long in air, dimensions of each prism 14 may be chosen to provide exact focusing on each of the sensitive elements.

As in the embodiment of FIGS. 2 and 3, any number of prisms chosen in accordance with the above teachings may be included. In the present embodiment, each prism 14a-14d has its first reflecting surface 18 positioned to intercept the cone of rays 16 in the same manner as the prism 14 of the embodiment of FIGS. 2 and 3.

Referring in greater detail to FIG. 5, the detector 3a is similar to the detector 3 of FIG. 2, but includes a plurality of sensitive elements, 6a-6h rather than a single sensitive element 6. In one embodiment, the detector 3a includes four sensitive elements 6a-6d, equal to the number of prisms on the scanning wheel 13a. In another embodiment, the detector 3a includes a number of sensors 6 equal to a multiple of the number of prisms 14 on the scanning wheel 13a. For example, as illustrated in FIG. 5 the detector 3a includes eight sensitive elements 6a-6h.

Due to the dimensions of the prisms 14a-14d, when the prism 14a is over the lens 2, it focuses optical energy on the sensitive element 6a. Similarly, the prisms 14b, 14c and 14d sequentially focus optical energy on the sensitive elements 6b, 6c and 6d respectively. In this embodiment, the lines $a-d$ of the object A of FIG. 1 may be scanned sequentially without motion of the object scanning mirror 8. In the further embodiment in which the number of sensitive elements 6 is equal to a multiple of the numbers of prisms 15 on the scanning wheel 13a is included, and interlaced scan of the image is provided. In other words as the prism 14a passes over the lens 2, it scans the line a and focuses optical energy on the sensitive element 6a and at the same time scans the line e, focusing optical energy on the sensitive element 6e. Similarly, as the prism 14b passes over the lens 2, it focuses optical energy from line b sensitive element 6b and optical energy from line f on sensitive element 6f. Prisms 14c and 14d similarly scan lines c and g and lines d and h, focusing optical energy on sensitive elements 6c and 6g on sensitive elements 6d and 6h respectively. In this manner, an interlaced scan of the image of an entire object is achieved without use of object scanning means.

An interlaced scan is one in which more than one nonconsecutive line is scanned at a time, and when the scanning is completed, a complete image scan is achieved. Further sensitive elements beyond 6h and/or more prism of different dimensions beyond 14d may be provided to increase the field of view of the image plane scanning system. In this manner, the object scan mirror 8 may be eliminated. The number nm of scan lines obtained is equal to the number of n of prisms of differing dimensions times the number m of sensitive elements associated with each prism. In the embodiment of FIG. 3 four prisms are provided and two sensitive elements are provided associated with each prism. Hence eight scan lines are provided. Further sensitive elements may be provided, and any number of prisms consistent with the above teachings may be provided.

What is claimed as new and desired to be secured by Letters Patent of the United States is:

1. In a system for detecting optical energy, the combination comprising:
   a. a lens oriented along an axis for receiving optical energy;
   b. a detector displaced from said axis for responding to optical energy;
   c. a scanning wheel interposed between said lens and said detector; and
   d. a prism mounted on said scanning wheel having a first reflecting surface in the vicinity of the periphery of said scanning wheel for reflecting optical energy transmitted from said lens and a second reflecting surface radially inwardly of said first reflecting surface with respect to said wheel for directing optical energy to said detector, said scanning wheel and said detector being positioned and said prism being dimensioned such that an image is focused on said detector.

2. A system according to claim 1 in which said prism consists of a material having a high index of refraction, whereby the mechanical focal length of said lens is increased.

3. A system according to claim 2 in which said prism comprises a rhomboid.

4. A system according to claim 3 in which said prism consists of fused germanium.

5. In an optical energy detection system, the combination comprising:
   a. a lens for focusing optical energy;
   b. a detector responsive to optical energy focused thereon;
   c. a rotatatable scanning wheel positioned in an optical path from said lens to said detector; and
   d. a plurality of rhomboid prisms spaced about said scanning wheel each having a first surface in the vicinity of the periphery of said scanning wheel for reflecting a cone of rays leaving an exit aperture of said lens and a second reflecting surface radially inwardly of said first reflecting surface for reflecting optical energy reflected from first reflecting surface to said detector, said detector and wheel being positioned and said prisms being dimensioned such that optical energy reflected by each of said prisms from said lens to said detector is focused on said detector.

6. A system according to claim 5 in which said prisms comprise constant deviation prisms.

7. A system according to claim 6 in which said prisms are equiangularly spaced on said scanning wheel.

8. A system according to claim 7 in which each of said prisms is of the same length measured in the radial direction of said scanning wheel.

9. A system according to claim 6 in which said prisms are of different lengths in the radial direction of said scanning wheel, and of differing thicknesses such that focusing of optical energy on said detector is maintained, whereby interlaced scan is provided.

10. A system according to claim 9 in which said detector includes a number of sensitive elements equal to a multiple of the number of said prisms on said scanning wheel, the center to center distance of said sensitive elements being equal to the difference of radial lengths between said prisms, whereby interlaced scan is provided.

11. A system according to claim 9 in which n prisms are provided and said detector includes m sensitive elements associated with each prism, whereby nm interlaced scan lines are provided.

12. In an optical energy detection system including a lens and a detector, the improvement comprising: a rotatable scanning wheel disposed in an optical path between said lens and said detector, said rotatable scanning wheel having mounted thereon
   a plurality of wedge-shaped rhomboid prisms angularly spaced about the periphery of said scanning wheel, each prism having a first relfective surface in the vicinity of the periphery of said scanning wheel for intercepting a cone of rays emanating from an exit aperture of said lens and a second reflecting surface parallel to said first reflecting surface for reflecting optical energy from said first reflecting surface to said detector.

13. In an image plane scanning system comprising a lens for receiving optical energy and a detector, the improvement comprising: a scanning wheel interposed in an optical path between said lens and said detector, said scanning wheel having mounted thereon at least one prism with first and second reflecting surfaces for reflecting optical energy from said lens to said detector, said first reflecting optical energy to said second surface.

14. In a system for detecting optical energy, in combination comprising: receiving
   a. a lens having a focal length FL oriented along an axis for reciving optical energy;
   b. a detector displaced from said axis for responding to optical energy and placed an optical path length SFL from an entrance aperture of said lens;
   c. a scanning wheel interposed between said lens and said detector; and
   d. a prism mounted on said scanning wheel, said prism and said lens providing a focal length of SFL, having a first reflecting surface in the vicinity of the periphery of said scanning wheel for reflecting optical energy transmitted from said lens and a second reflecting surface radially inwardly of said first reflecting surface with respect to said wheel for directing optical energy to said detector, said scanning wheel and said detector being positioned and said prism being dimensioned such that an image is focused on said detector and such that the optical path through said prism and to said detector is no longer than SFL minus MBFL, where MBFL corresponds to the mechanical back focal length of a long focal length lens having multiple elements and said prism.

15. In an optical energy detection system, the combination comprising:

a. a lens having a focal length FL for focusing optical energy;
b. a detector responsive to optical energy focused thereon and placed an optical path length SFL from an entrance aperture of said lens;
c. a rotatable scanning wheel positioned in an optical path from said lens to said detector; and
d. a plurality of rhomboid prisms spaced about each scanning wheel, each of said rhomboid prisms having a first surface in the vicinity of the periphery of said scanning wheel for reflecting a cone of rays leaving an exit aperture of said lens and a second reflecting surface radially inwardly of said first reflecting surface for reflecting optical energy reflected from first reflecting surface to said detector, said prism and said lens providing a focal length of SFL, said detector and wheel being positioned and said prism being dimensioned such that optical energy reflected by each of said prisms from said lens to said detector is focused on said detector, and such that the optical path through said prism and to said detector is no longer than SFL minus MBFL, where MBFL corresponds to the back focal length of a long focal length lens having multiple elements and said prisms.

16. In an optical energy detection system including a lens having a focal length FL and a detector, improvement comprising: a rotatable scanning wheel disposed in an optical path between said lens and said detector, said rotatable scanning wheel having mounted thereon a plurality of wedge-shaped rhomboid prisms angularly spaced about the periphery of said scanning wheel, each prism having a first reflective surface in the vicinity of the periphery of said scanning wheel for intercepting a cone of rays emanating from an exit aperture of said lens and a second reflecting surface parallel to said first relfecting surface for reflecting optical energy from said first reflecting surface to said detector, whereby an image is focused at an optical path length SFL from an entrance aperture of said lens which is longer than FL such that said scanning wheel may be placed at an optical path length from said lens so that each of said prisms intercepts an entire cone of trays focused by said lens at a greater distance from said lens than the distance at which a first of a pair of parallel reflecting mirrors would be placed to focus an image at an optical path length FL from said lens.

* * * * *